J. Mathias,
Bee Hive.

No. 69,569. Patented Oct. 8, 1867.

Witnesses
Guy C. Humphries
Chas. A. Herron

Inventor
John Mathias
by
L. E. Jones & Co.
his Attorneys

United States Patent Office.

JOHN MATHIUS, OF PEMBERTON, OHIO.

Letters Patent No. 69,569, dated October 8, 1867.

---

IMPROVEMENT IN BEE-HIVES.

---

The Schedule referred to in these Letters Patent and making part of the same.

---

TO ALL WHOM IT MAY CONCERN:

Be it known that I, JOHN MATHIUS, of Pemberton, in the county of Shelby, and State of Ohio, have invented new and useful Improvements in Bee-Hives; and I do hereby declare the following to be a full, clear, and exact description thereof, reference being had to the annexed drawings making part of this specification, in which—

Figure 1:
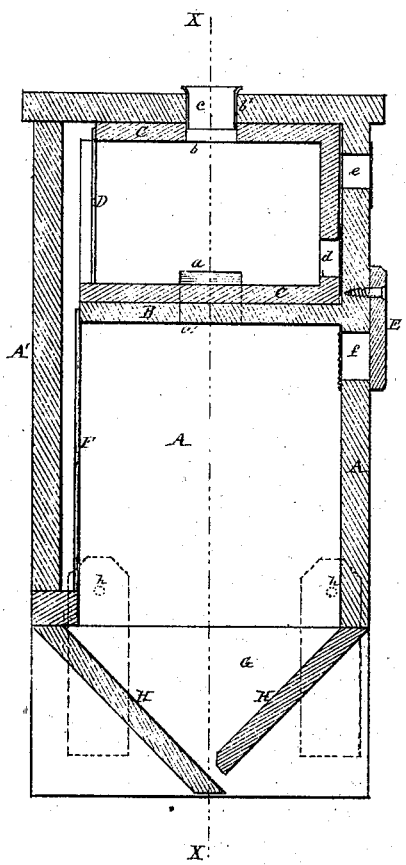
Figure 1 is a vertical section from front to rear of my bee-hive.
Figure 2:
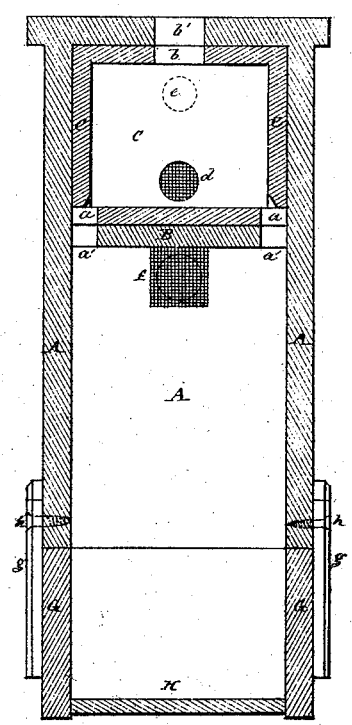
Figure 2 is a vertical section on the line X X of fig. 1.

In the drawings A is the hive, furnished with a door, A', swinging upon hinges at one edge, and fitted to close the hive tight when desired. The hive is divided into two portions by the horizontal partition B. The upper portion has within it a case or drawer, c, resting on the partition B, and which may easily be withdrawn from the hive when necessary. The case or drawer C is provided with openings, $a$, in its lower corners, which are immediately over and form continuations of similar openings $a'$ in the partition B. These are shown in dotted lines in fig. 1, and more distinctly in fig. 2. These are to allow the bees to pass from the lower portion of the hive to the case C, which has its front closed by a sliding pane of glass, D, so that its interior can be seen when the door A' is open. An opening, $b$, in the top of the case C, is exactly under a similar opening, $b'$, in the top of the hive. The object of these openings is to allow the bees to pass into another hive when it becomes expedient to have them do so, which hive is to be placed on the one described. A tube, $c$, of tin or other sheet metal, extends down through the opening $b'$ in the top of the hive into the opening $b$ in the top of the case C, and prevents the bees from getting into the space between the case C and the top of the hive, where they might be killed. When the openings $b$ $b'$ are not wanted for the passage of the bees from one hive to another the tube $c$ is to be closed by a stopper. Openings $d$ and $e$ in the back of the case and hive are covered with coarse wire-gauze screens, and serve as ventilators. Another ventilating opening, $f$, in the lower portion of the hive through the back, is also covered with a screen of wire gauze, and may be closed, when necessary, by the wicket E on the outside of the hive, (see fig. 1.) The front of the lower portion of the hive may also be closed by a pane of glass, F, so that when the door A' is opened the interior may be seen without allowing the bees to come out, and without disturbing them. To the bottom of the bee-hive is attached a boxing, consisting of the side pieces G G, and inclined planes H H. The cleats $g$ $g$ are firmly secured to the side pieces G, and extend up above the bottom of the hive, a short distance along the sides of the hive, to which they are attached by screws $h$ $h$, seen in dotted lines in fig. 2, so that the boxing and its inclined planes may be separated from the hive if necessary, and the hive used without them. The inclined planes H H have an opening between their lower edges for the passage of the bees, and whenever moths, worms, or other enemies of the bees get through the opening into the space between the inclined planes they will not be able to mount to the hive, or, if they do, will fall back upon the inclined planes and roll out at the bottom.

Having thus fully described my invention, what I claim as new therein, and desire to secure by Letters Patent, is—

1. The hive A A' and case C, with their openings $a$ $a'$, $b$ $b'$, and $f$, arranged as set forth in combination with the tube $c$, substantially as and for the purpose described.

2. The inclined planes H H, in combination with the hive A and tube $c$, substantially as and for the purpose set forth.

In testimony whereof I have signed this specification in the presence of two subscribing witnesses.

JOHN MATHIUS.

Witnesses:
 MARSHAL PEPPER,
 GEORGE W. JOHNSTON.